United States Patent [19]

Linggard et al.

[11] Patent Number: 5,794,190
[45] Date of Patent: Aug. 11, 1998

[54] SPEECH PATTERN RECOGNITION USING PATTERN RECOGNIZERS AND CLASSIFIERS

[75] Inventors: Robert Linggard, Suffolk; Philip Charles Woodland, Cambridge; John Edwrd Talintyre, Essex; Samuel Gavin Smyth, Suffolk, all of England

[73] Assignee: British Telecommunications public limited Company, London, England

[21] Appl. No.: 338,158

[22] Filed: Nov. 9, 1994

Related U.S. Application Data

[63] Continuation of Ser. No. 955,730, filed as PCT/GB91/00668 Apr. 26, 1991 published as WO91/16687 Oct. 31, 1991, abandoned.

[30] Foreign Application Priority Data

Apr. 26, 1990 [GB] United Kingdom ............ 9009425

[51] Int. Cl.$^6$ .................................................. G10L 9/00
[52] U.S. Cl. .................................. 704/232; 704/239
[58] Field of Search .................... 395/2, 2.11, 2.41, 395/2.68, 21, 23, 24; 381/42, 43; 704/200, 202, 232, 259, 240, 243, 244, 239, 245

[56] References Cited

U.S. PATENT DOCUMENTS

| 5,031,217 | 7/1991 | Nishimura | 381/43 |
| 5,083,285 | 1/1992 | Shima et al. | 395/24 |
| 5,228,087 | 7/1993 | Bickerton | 381/43 |
| 5,317,673 | 5/1994 | Cohen et al. | 395/2.41 |

FOREIGN PATENT DOCUMENTS

WO 89/02134  3/1989  WIPO.

OTHER PUBLICATIONS

IEEE First International Conference On Neural Networks, 21–24 Jun. 1987, San Diego, CA., R.P. Lippmann et al.: "Neural–Net Classifiers Useful for Speech Recognition", pp. IV 417–425.

IEEE International Conference On Neural Networks, 24–27 Jul. 1988, San Diego, CA.., IEEE, (New York), C.–H. Sung et al.: "Temporal Pattern Recognition", pp. I–689–I–696.

British Telecom Technology Journal, vol. 6, No. 2, Apr. 1988, N. McCulloch et al.: "Multi–Layer Perceptrons Applied to Speech Technology", pp. 131–139.

IEEE Transactions On Acoustics, Speech, And Signal Processing, vol. ASSP–27, No.4, Aug. 1979, IEEE (New York), L.R. Rabiner et al.: "Speaker–Independent Recognition of Isolated Words Using Clustering Techniques", pp. 336–349.

British Telecom Technology Journal, vol. 6, No. 2, Apr. 1988, S.J. Cox: "Hidden Markov Models for Automatic Speech Recognition: Theory and Application", pp. 105–115.

Proceedings Of The IEEE, vol. 77, No. 2, Feb. 1989, L.R. Rabiner: "a Tutorial on Hidden Markov Models and Selected Applications in Speech Recognition," pp. 257–286.

R. Lippmann, "A Critical Overview of Neural Network Pattern Classifiers," Neural Networks for Signal Processing, Sep. 30–Oct. 1, 1991, pp. 266–275.

W. Huang, R. Lippmann, and B. Gold, "A Neural Net Approach to Speech Recognition," ICASSP '88, Apr. 4–11, 1988, pp. 99–102.

(List continued on next page.)

*Primary Examiner*—Allen R. MacDonald
*Assistant Examiner*—Richemond Dorvil
*Attorney, Agent, or Firm*—Nixon & Vanderhye P.C.

[57] ABSTRACT

An apparatus for recognizing predetermined patterns comprises an input for signal data; a pattern matching stage including a plurality of stores, each storing a representation of a pattern to be recognized; a similarity measurer for producing, for each representation, a measure of the similarity between the signal data and that representation; and a classification stage for deciding from the similarity measures which, if any, of the patterns to which the representations correspond is present in the signal data, and for indicating the presence of any such pattern. The classification stage makes its determination based on all the similarity measures after having been trained using information relating to known patterns and the similarity measurer from the pattern matching stage produced by inputting known patterns.

23 Claims, 2 Drawing Sheets

OTHER PUBLICATIONS

S. Austin, G. Zavaliagkos, J. Makhoul, and R. Schwartz, "A Hybrid Continuous Speech Recognition System Using Semental Neural Nets with Hidden Markov Models," Neural Networks for Signal Processing, Sep. 30–Oct. 1, 1991, pp. 347–356.

S. Austin, G. Zavaliagkos, J. Makhoul, and R. Schwartz, "Speech Recognition Using Segmental Neural Nets," ICASSP '92, Mar. 23–26, 1992, pp. 625–628.

S. Austin, G. Zavaliagkos, J. Makhoul, and R. Schwartz, "Continuous Speech Recognition Using Segmental Neural Nets," Jun. 7–11, 1992, pp. 314–319.

R. Lippmann and E. Singer, "Hybrid Neural–Network/HMM Approaches to Wordspotting," ICASSP '93, Apr. 27–30, 1993, pp. 565–568.

E. Singer and R. Lippmann, "A Speech Recognizer Using Radial Basis Function Neural Networks in an HMM Framework," ICASSP '92, Mar. 23–26, 1992, pp. 629–632.

Gao et al, "HMM Based Warping in Neural Networks," ICASSP '90, Apr. 3–6, 1990, pp. 501–504.

Prinslou et al, "A Hidden Markov Model For Acoustic Syllabification and Processing Class Labelling In Continous Speech," Comsig 89, Jun. 23, 1989.

Ma et al., "TDNN Labeling For A HMM Recognizer," ICASSP '90, Apr. 3–6, 1990, pp. 421–423.

Howard et al., "Two Level Recognition of Isolated Word Using Neural Word," Artificial Neural Nets, 1989, Oct. 16–18, 1989, pp. 90–94.

SPEECH PATTERN RECOGNITION USING PATTERN RECOGNIZERS AND CLASSIFIERS

This is a continuation of application Ser. No. 07/955,730, filed as PCT/GB91/00668 Apr. 26, 1991 published as WO91/16687 Oct. 31, 1991, now abandoned.

BACKGROUND

I. Field of the Invention

This invention relates to pattern recognition apparatus and particularly, but not exclusively, speech recognition apparatus. This invention relates also to a method of training such apparatus, and a method of use thereof.

II. Related Art and Other Considerations

Conventional pattern recognition apparatus typically comprises an input for signal data representing the pattern; a front end processor which extracts some (hopefully) significant features of the signal and discards other data (depending on the nature of the signal, this stage may be unnecessary), a set of stores each holding a representation of features which correspond to a known pattern to be recognised; a comparison device which compares the features extracted from the signal data with the contents of each store to produce, for each, a variable score, or measure, of the similarity (or distance, in feature space) between the signal data and that representation of the known pattern; and a decision device which selects the pattern to which the signal data is most similar on the basis of the measures. One store will be provided for each known pattern, although some cases and some patterns may have several corresponding stores, each holding a different stored representation.

In the field of speech recognition, one successful and widely used type of recogniser of this general kind employs a technique known as dynamic time warping (DTW) to effect the comparison. DTW is discussed in, for example, Speaker Independent Recognition of Works Using Clustering Techniques, L. R. Rabiner et al. IEEE Trans on ASSP, Vol 24, No. 4, August 1979.

This technique is employed because it allows a comparison which is substantially independent of the position or duration of pattern events in the signal, so as to align corresponding parts of two utterances. An analogous technique (known as dynamic space warping) is also available for image recognition.

It is also known to use a hidden Markov model (HMM) in speech recognition, with a similar benefit in reducing the dependence on event duration or position. This is discussed in, for example, U.S. Pat. No. 4,587,670; in "Hidden Markov models for automatic speech recognition"—S. J. Cox, British Telecom Technology Journal Vol. 6 No. 2 April 1988 p.105; and in "A Tutorial on Hidden Markov Models and selected Applications, Speech Recognition"—L. R. Rabiner, Proc. IEEE Vol. 77 No. 2 February 1989 p.257.

In either case, the decision as to which, if any, recognisable pattern is present is made typically by simply selecting the class (which in speech recognition will be a word or other speech particle) with the best class score; the class score being calculated as the sum of the k best matching exemplars from that class or the K nearest neighbours (K–NN) may be used. The K–NN rule is described in "Speaker-Independent Recognition of Isolated Words Using Clustering Techniques", L. R. Rabiner et al. IEEE Trans. on ASSP, Vol. 24, No. 4, August 1979. Thus, in these methods, decisions are made on the basis of a subset (generally small) of the available scores.

Of course KNN and other selective decision making methods are attractive in part because they enable one quickly to focus on what should, logically speaking, be the most relevant classes, the low-scoring classes being ignored. This approach is clearly advantageous in any application where many decisions need to be made and/or where the total number of classes is large. The prevelance of KNN and other selective decision making methods is testimony to the perceived benefits of this approach. Thus, although it could be observed that decisions made using KNN deliberately ignore information, that is class scores, it is reasonable to assume that the discarded information amounts to no more than "these classes have very low scores" and that consequently the decision, which is based on comparison of only the K classes with the K highest scores, is no worse for having discarded that information.

SUMMARY

Surprisingly, we have discovered that the performance of pattern recognition apparatus can be improved, relative to that obtained through the use of KNN decision making, by making decisions on the basis of all the scored classes.

Lippman & Gold in their paper "Neural Net Classifiers Useful for Speech Recognition," published in Proceedings of the International conference of Neural Networks, San Diego, June 1987, IEEE, Vol-4, pages IV-417–IV-425, suggest that the different tasks within a speech recognizer can be performed by different neural nets. In particular they suggest that the four major tasks which must be performed in isolated word speech recognizers can be accomplished using a different specialized neural net to perform each of the tasks. The four tasks which Lippman & Gold identify are:

i) pre-processing to extract important information from the speech waveform;

ii) determining the local distance between the time-sampled output values from the preprocessor and stored exemplar values;

iii) time-aligning the input spectra to classification nodes in the word models (that is a form of dynamic time warping); and iv) selecting the word with the best score by packing the word model with the maximum output.

In fact although Lippman & Gold apparently refer to the possibility of using specialized neural nets to perform each of these tasks, in the relevant section of the paper the pre-processing step is discussed only with reference to conventional pre-processors. Lippman & Gold apparently favor pre-processors which provide both spectral amplitude information and waveform synchrony information similar to that available on the auditory nerve. There is no concrete proposal as to how a neural net might be used for pre-processing.

There is extensive discussion of local distance determination, that is step ii), and in this Lippman & Gold favor multi-layer perceptrons and their use is discussed at length.

For the time alignment task, step iii), Lippman & Gold propose a new neural net which performs the Viterbi algorithm for continuous-valued parameters and which they term a Viterbi net. The performance of this task and the use of the Viterbi net is discussed at length.

The last step, that is step iv), is dealt with in fewer than ten lines. It is stated that the "recognizer must select that word model with a maximum output by allowing that word model to have a strong output and inhibiting the output of other models," and on this basis the use of extensive lateral inhibition is a fully-connected recursive feed-back network is proposed. Feed-forward nets are proposed as alternatives for situations when the actual value of the maximum node output or instantaneous response is required. Thus it will be seen that what Lippman & Gold were proposing for this stage was a neural net to provide the same function as is routinely provided in the decision stage of any recognizer— that is merely selecting the maximum of a set of values.

This "direct replacement" approach is entirely understandable, given that the accepted way to tackle the decision stage was, as discussed above, simply to select the maximum, discarding the lower scoring items. The implementation of such a strategy is of course simple with neural nets. The nets are arranged to emphasize a large value and to reduce the smaller ones, the nets being hard wired with a positive (i.e., excitement) value from each node (usually in a single layer) to itself and a negative weight to all other nodes.

However, this approach is distinct from that according to the invention in which the decision is made on the basis of all scored classes—i.e., one does not automatically select the class with the maximum value. The invention uses a decision stage which has learned to make the decision. The use of a trainable net for step iv) is not taught by Lippman & Gold.

According to a first aspect, the present invention provides apparatus for recognising predetermined patterns, comprising; an input for signal data; a plurality of stores each storing a representation of a pattern to be recognised; means for producing, for each said representation, a measure of the similarity between the signal data and that representation; and means for deciding from the said measures which, if any, of the patterns to which the representations correspond is present in the signal data, and for indicating the presence of any such pattern; characterised in that the means for deciding are arranged to do so on the basis of all of the said measures, each recognisable pattern corresponding to a predetermined function of a predetermined plurality of the said measures.

According to a second aspect the present invention provides a method of pattern recognition comprising: receiving input signal data; comparing the input signal data with each of a plurality of stored representations each corresponding to a pattern to be recognised to produce a plurality of corresponding similarity measures; producing for each pattern to be recognised a score which is a predetermined function of a pre-determined plurality of the similarity measures, and indicating the recognised pattern on the basis of the scores.

One way of viewing an embodiment of the invention is to treat the score information as defining a point in a "score space", i.e. the similarity measures are used as the input features set to a classifier. This approach has the theoretical attraction that, under certain conditions, the measures are actual distances in a metric space (of unknown dimension) and therefore it is possible to map distances into an "utterance space" (in the case of speech recognition) with tokens being classified on the basis of positions in that space.

Conventional techniques concentrate only on high-valued measures or classes, as these correspond to patterns to which the input signal data is most similar. However, we have found a considerable and surprising increase in accuracy of recognition can be obtained by taking account also of measures corresponding to cases to which the signal data is not similar, in combination.

Although many types of classifier could be used as the decision means, several particular types are preferred.

A Gaussian classifier, as described in "Classification Algorithms", Mike James, Collins, ISBN 0-00-383054-3 or "Pattern Recognition, A Statistical Approach", P. A. Devijver & J. Kittler, Prentice-Hall, ISBN 0-13-654236-0 is one preferred embodiment giving a particularly high accuracy on data types (such as suitably parameterised speech) which are well modelled by Gaussian statistics. In this case, the Gaussian model for each recognisable pattern is derived by calculation on training data.

A second suitable type of classifier is a neural network, the connecting weights of which may be derived in a training phase on test data. A multi layer network such as the multi-layer perceptron (MLP), described in—for example— "Multi-layer perceptrons applied to speech technology"—N. McCulloch et al. British Telecom Technology Journal Vol. 6 No. 2 April 1988 page 131, is preferred because the mappings involved are not necessarily linear with many types of signal.

There is some apparent similarity between the invention as defined above and a conventional MLP, insofar as the input layer of a MLP comprises a set of nodes each receiving the input signal vector and producing an output which is, in face, a measure of the similarity between the input signal vector and the weight vector of that mode. This apparent similarity is illusory however, in that whereas according to the invention the input layer (DTW or HMM) is separately trained to derive the stored templates, in an MLP the weight vectors stored in the input layer are trained as part of the whole net and hence will not generally bear any particular relation to the patterns to be recognised.

Preferred methods of training are as disclosed in the claims.

Other advantages and preferred features will be apparent from the description and claims.

BRIEF DESCRIPTION OF THE DRAWINGS

The invention will now be described, by way of example only, with reference to the accompanying drawings in which.

DETAILED DESCRIPTION OF THE DRAWINGS

Figure 1:
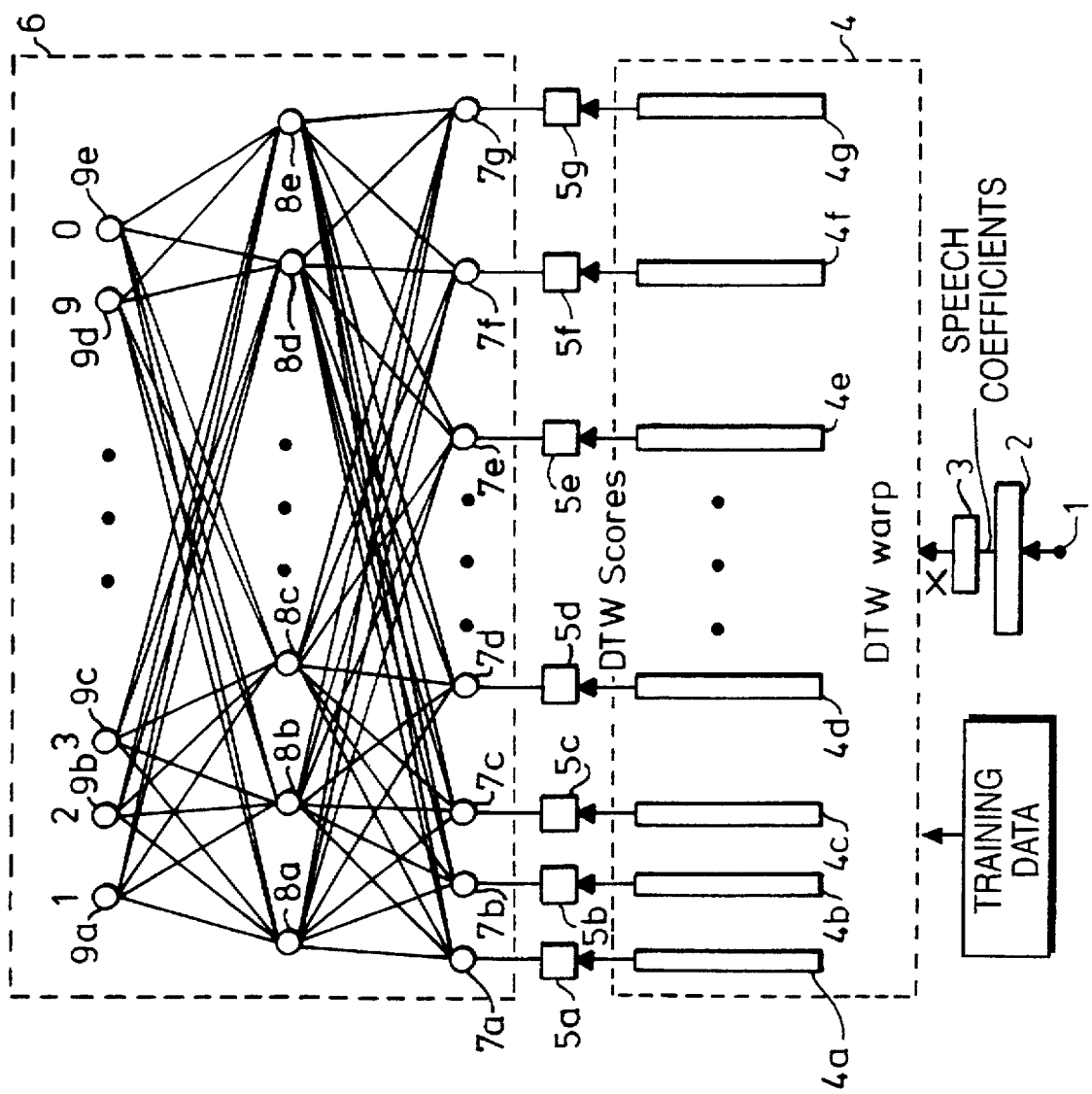
FIG. 1 shows schematically an embodiment of the invention for speech recognition.

Referring to FIG. 1, speech signal from a microphone is received at an input, sampled (eg. at 8 KHz), band limited and digitised (not shown). At suitable intervals (16 msecs) the signal is analysed to derive a set, or frame of features (which may be LPC coefficient or spectral transform coefficients but are preferably mel-frequency cepstral coefficients), by a front end processor 2. A start (and end) point detector 3 detects the start of a speech event in the signal, and from this point the detected end point, feature frames are accumulated to form an input vector $X(=x_0, x_1 \ldots x \ldots x_N)$.

This vector X forms the input to the DTW stage 4 used to generate similarity distances measures. The DTW stage 4 comprises a plurality m of stores 4a–4g, at least one for each pattern (i.e. word) to be recognised. For example, ten stores may be provided for each word. Each store 4a–4g contains a template comprising an averaged feature derived from training data. The input feature vector X is compared with each stored template, and for each a similarity measure $S_d$ is circulated using DTW.

The similarity measures $S_o$-$S_d$ may then be appropriately scaled (as discussed below) by scaling units 5a–5g. The scaled similarity measures $S'_o$-$S'_d$ form the inputs to input nodes of a multilayer perceptron 6 of a known kind. In such a structure, the plurality of input nodes 7a–7g are connected to the nodes of a hidden layer 8a–8e; where the number of patterns is relatively small, full interconnection is preferred, but is not mandatory. The hidden nodes 8a–8e are connected to a plurality of output nodes 9a–9e which are at least equal in number to the numbers of patterns to be recognised. Again, full interconnection where possible is preferred. Within each connection, there is a weight (not shown), the value of which is determined during training. The output of each node is the sum of its (weighted) inputs, multiplied by a sigmoidal non-linear activation function. Multiple hidden layers could be provided to model more complex data mappings.

Each output node 9a–9e provides a signal corresponding to detection of a given pattern class. The "correct" detected pattern may be selected by locating the largest output node signal.

Several commercially available products are suitable for feature extraction and DTW stages 1–4. Generally, a digital signal processing (DSP) single chip device is capable of providing the necessary hardware.

Although there are reports in the literature of suitable hardware (purely analogue, purely digital or hybrid) for realising a multilayer perceptron as described above in the recognition mode, there are also advantages to the use of a conventional microprocessor of DSP digital processor emulating a network; the processing power required is at least an order of magnitude less than a rule-based approach to the same recognition problem. The invention therefore encompasses both; the phrase "neural network" herein has this broad meaning (but excludes living organisms).

Suitable training algorithms for such neural networks are known; for example, the Rumelhart back propogation algorithm which is described in "Parallel Distributed Processing" Vol. 1, David E. Rumelhart, James L. McClelland, and the PDP Research Group, Part II, Section 8, MIT Press, ISBN 0-262-18120-7 is one such method. It should be noted that the number of output nodes 9a–9e can exceed the number of signal classes for which the DTW stage includes templates (unlike the DTW recognisers known in the prior art). For example, an output node corresponding to "class not recognised" could be included, as an automatic failure test. Equally, the recognised signal classes could be expanded by the addition of extra output nodes during the training of the MLP; for example, in a digit recogniser, it might be possible to include outputs (for example "14" on the basis of the digits 0–9, this output being excited from a weak firing of the "4" (input node), although recognition of such extra classes is not expected to be as reliable.

Figure 2:
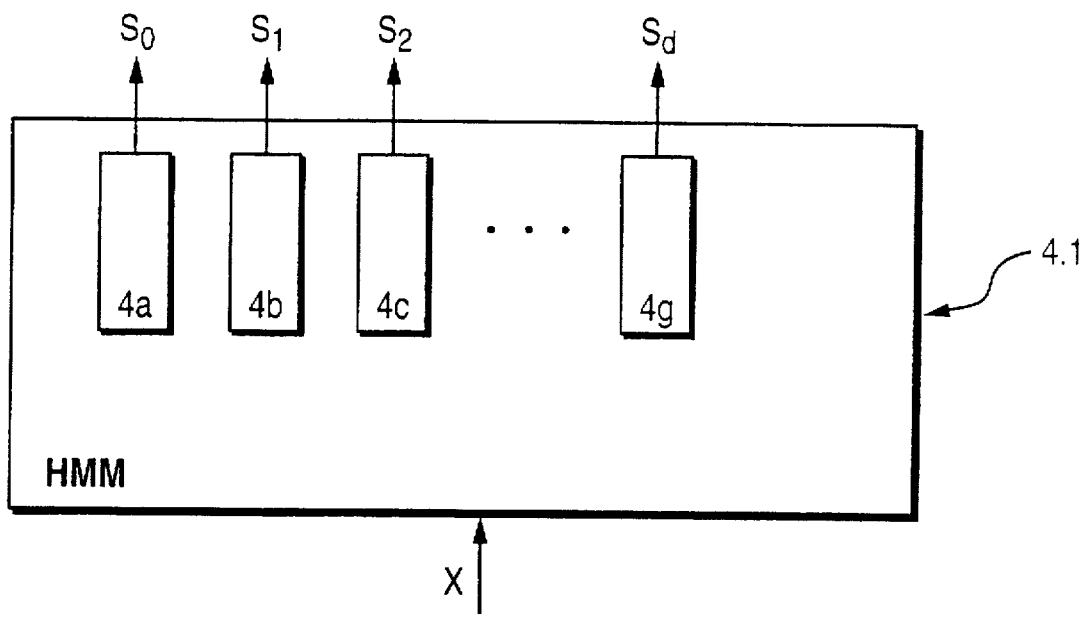
FIG. 2 shows a Hidden Markov Model pattern recognition stage.

The training data set for MLP Stage 6 must not in general be identical to that for DTW Stage 4 (although this may at first sight seem surprising). In one alternative embodiment (FIG. 2, 4.1) as stated above, the DTW stage 4 is replaced with a Hidden Markov model (HMM) stage in which stores 4a–4g contain pre-determined state transition sequences (each associated with a particular pattern to be recognised), and the HMM stage includes a processor which calculates the probability of the given input vector X corresponding to each of those sequences using, for example, the well known Viterbi algorithm. These probabilities So-Sd are then supplied to the classifier stage 6 as previously. The methods of deriving suitable state transition models from training data are described in the above referenced publications.

Figure 3:
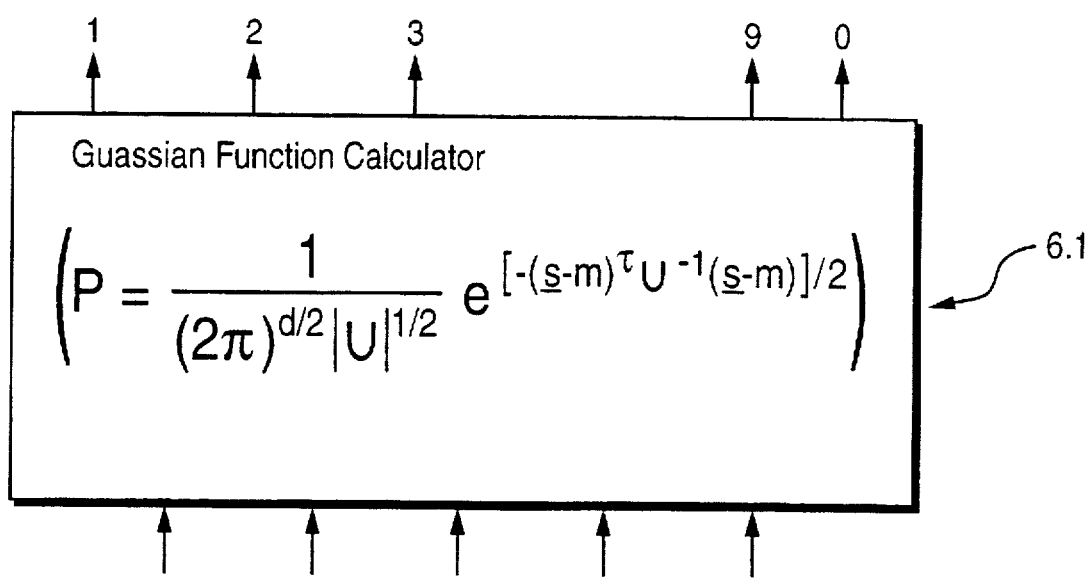
FIG. 3 shows a Gaussian function calculator classifier.

In another alternative embodiment of the invention (FIG. 3, 6.1) the classifier stage 6 functions as a Gaussian classifier rather than as a neural network. Accordingly, the similarity measures S=So-Sd supplied by the pattern matching stage 4 are received and employed as inputs to a Gaussian function calculator (performed typically by a microprocessor or digital signal processing device). The general form of such a function is as follows:

$$P = \frac{1}{(2\pi)^{\frac{d}{2}} |U|^{\frac{1}{2}}} e^{[-(s-m)^T U^{-1}(s-m)]/2}$$

where
U=covariance matrix
m=mean vector
d=dimensionality of input data of stores Each pattern to be recognised has a corresponding such Gaussian function and the result of applying the function to the similarity measures $S_o$-$S_d$ provides the output signal for that particular pattern. The pattern recognised may then be selected on the basis of the largest such output signal.

The method of deriving for each pattern to be recognised the correct Gaussian function parameters (i.e. the values of U & m) is described in, for example, "Classification Algorithms", Mike James, Collins, ISBN, 0-00-383054-3. As above, different training data to that used to train the pattern matching stage 4 should be employed.

Generalised Case Using DTW+MLP System as an Example

The DTW system will contain one or more reference templates per class. Each input utterance will be matched separately to all the stored reference templates, producing a score for each match.

The MLPs can be viewed as having a set of outputs (one for each class to be recognised), with each output being a function of a set of inputs. This set of inputs is derived from a subset of the reference templates and this subset is fixed before training and is unchanged for recognition. During recognition, the input utterance will be recognised as being of the class of the highest output.

In this system each set of inputs must contain scores from at least 2 classes. This clearly differentiates it from k-nearest neighbour rules. Typically each set of inputs will comprise all of the scores produced by the DTW sub-system.

The full system is trained in the following way:

the DTW reference templates are generated (using well known techniques).

Utterances of known class are matched using the DTW system to produce scores.

The MLP is trained using the score/class pair formed in the previous step i.e. the scores are the inputs and the class defines the output for the MLP (1 in n coding i.e. the output representing the class is set high, the others low). The training process defines the functions that produce the MLP outputs during recognition.

Other Cases

Other cases (e.g. HMM instead of DTW, and Linear classifier or Gaussian classifier instead of MLP) can be dealt with in the same way as the above example. The important distinction between this technique and more conventional approaches is the way it attempts to discriminate between classes by using information from more than one class to provide a value for each class to be considered. The utterance is recognised as the class with the highest value.

EXAMPLE

A subset of a manually end pointed database was used as the source of telephony quality spoken digits (1–9 & zero). The data had been sampled at 8 kHz and converted to a mel-frequency cepstral coefficient (MFCC) format with 8 MFCC coefficients every 16 msecs. The frame energy was not used.

This database was divided into speaker sets. To train the MLP decision rule requires a set of score data representative of those found in testing. To achieve this the designated training data (sets, A,B,C,D&E) was partitioned into two parts. The first part (set A) was used to train the DTW system; the second to train the MLP decision rule. The set used to train the DTW system had 12 clustered templates per word, then MLP training scores were generated by "testing" the DTW system on other sets utterances. Testing data for the decision rule was generated by "testing" the DTW system on different sets.

The MLP trains most successfully when input data is scaled so that it is approximately in the range ±1. To create MLP input with appropriate dynamic range, each DTW score, S, was transformed to a value S' by the following relation $$S' = s - B/a$$

With the score data used, scale factors of a=5 and B=9 were found to be suitable.

All MLPs used in the experiments had a single hidden layer, with total interconnection between adjacent layers with weight values limited to a maximum absolute value, M, as described in our earlier GB application 8915085.8 (agents ref: A24037). This has previously been found to give improved generalisation and weight quantisation performance. A sigmoid activation function (comparison) was used in the hidden and output units as discussed in out earlier GB application no. 8922528.8 (agents ref. A24098).

The data is divided into 10 classes (digits) and represented by 12 (scaled) scores per class, i.e., 12 clustered templates per word, giving all MLPs 120 input nodes. The networks used 10 outputs units with a "1-in-n" output coding as discussed in, and for the same reasons as set out in out previous PCT application GB90/00443. The data flow is as shown in FIG. 1. During training, the output node corresponding to the current utterance class was set to a value of 0.9 with all other units set of 0.1. During recognition the classified class was given by the unit with the largest output value.

A series of experiments were performed in which the number of hidden nodes, N, was varied between 5 and 35 and the maximum weight value set to 1.0, 1.5, 2.0 or "infinity". The learning paradigm used a maximum of 1500 iterations. Only one particular random weight start was used for each set of MLP parameters and all networks with the same number of hidden nodes started from the same random point. The training set accuracy along with three test set accuracies (c=1, 2, 3) are given in Table 1. For the test set, an utterance was classified as correct if the correct class was given by one of the highest c MLP output nodes. That is, when c=1 the highest MLP output node was the correct class; when c=2 the correct class was one or other of the two highest MLP output nodes; and when c=3, the correct class was one of the three highest MLP nodes. The results for c>1 give some idea of the overall recognition system performance when confirmatory checks are included in the dialogue.

TABLE 1

Classification results using MLP decision rule

| Hidden Nodes | Max. Weight | Training Set | Test Set Accuracy % | | |
|---|---|---|---|---|---|
| N | M | Accuracy % | c = 1 | c = 2 | c = 3 |
| 5  | ∞   | 99.03 | 92.80 | 97.19 | 98.71 |
| 10 | 1.0 | 96.66 | 95.66 | 99.09 | 99.52 |
| 10 | 1.5 | 98.42 | 96.33 | 99.09 | 99.62 |
| 10 | 2.0 | 99.05 | 96.85 | 99.05 | 99.67 |
| 10 | ∞   | 99.78 | 96.04 | 98.71 | 99.19 |
| 15 | 1.0 | 98.25 | 96.66 | 99.24 | 99.81 |
| 15 | 1.5 | 99.07 | 96.66 | 99.00 | 99.67 |
| 15 | 2.0 | 99.51 | 96.71 | 99.19 | 99.71 |
| 20 | 1.0 | 98.85 | 97.09 | 99.38 | 99.76 |
| 20 | 1.5 | 99.56 | 97.38 | 99.09 | 99.71 |
| 20 | 2.0 | 99.59 | 97.28 | 99.00 | 99.76 |
| 20 | ∞   | 99.78 | 96.52 | 98.95 | 99.62 |
| 25 | 1.0 | 99.20 | 97.00 | 99.38 | 99.76 |
| 25 | 1.5 | 99.34 | 96.76 | 99.14 | 99.62 |
| 25 | 2.0 | 99.46 | 96.81 | 99.09 | 99.71 |
| 30 | 1.5 | 99.42 | 97.14 | 99.09 | 99.67 |
| 35 | 1.5 | 99.76 | 96.95 | 99.09 | 99.48 |

It can be seen from Table 1 that a wide range of MLP configurations perform well on the test set. However, for only five hidden nodes the system learns most of the training data by using a mapping that doesn't generalise well since large weights develop. With larger numbers of hidden nodes it is possible to get good performance on the training and test sets if weight limiting constraints are introduced.

The best test-set configuration on the basis of the top candidate only (97.38%) is with 20 hidden nodes and M=1.5. However, MLPs with M=1.0 give optimal test set performance for c=2 and c=3. The beneficial effect on generalisation of weight-limiting is apparent in the training set/test-set (c=1) trends for 20 hidden node MLPs. While training set performance increases as weight limits are relaxed, test set performance reaches a peak at M=1.5.

Comparative Results

In the closest type of conventional DTW system, the DTW scores would be passed directly to a k-Nearest neighbour (KNN) decision rule. Since the KNN rule applied directly to the scores requires no training, the correct choice of DTW training set for comparison is not clear. For completeness, results of using both set A for DTW training and testing on sets F & G (and hence producing the same scores as seen by the MLP rule) as well as those produced by training the DTW system on sets A, B, C, D & E (all data used by the DTW/MLP combination) were collected. These results for values of k between 1 and 3, are shown in Table 2.

TABLE 2

Classification results using k-Nearest neighbour decision rule

| DTW | Value of | Test Set Accuracy % | | |
|---|---|---|---|---|
| Training Set | k | c = 1 | c = 2 | c = 3 |
| A    | 1 | 93.28 | 97.95 | 99.00 |
| A    | 2 | 93.85 | 98.28 | 98.86 |
| A    | 3 | 93.61 | 98.00 | 98.81 |
| ABCDE | 1 | 92.99 | 98.28 | 99.05 |

TABLE 2-continued

Classification results using k-Nearest neighbour decision rule

| DTW Training Set | Value of k | Test Set Accuracy % | | |
|---|---|---|---|---|
| | | c = 1 | c = 2 | c = 3 |
| ABCDE | 2 | 94.66 | 98.24 | 99.24 |
| ABCDE | 3 | 94.52 | 98.09 | 99.24 |

TABLE 3

Comparative test set results for best MLP & best KNN

| Decision Rule | Test Set Accuracy % | | |
|---|---|---|---|
| | c = 1 | c = 2 | c = 3 |
| k-Nearest Neighbour | 94.66 | 98.22 | 99.24 |
| Weight Limited MLP | 97.38 | 99.09 | 99.71 |

The best variants of the decision rule (measured in terms of c=1 test set accuracy) for the MLP (N=20, M=1.5) and KNN (training set ABCDE, k=2) are summarised in Table 3. This table clearly emphasises the performance advantage of the MLP decision rule. For the most important c=1 case, the error rate is more than halved by using the MLP, with similar sized relative improvements for both the c=2 and c=3 cases. Using McNemar's test (Gillick, L & Cox, S. J. (1989) Some statistical issues in the comparison of speech recognition algorithms. Proc. ICASSP, Glasgow, Scotland) it was found that the test set performance improvement for c=1 is statistically significant at the 99.9% level.

For the test MLP, (N=20, M—1.5) there are 2690 weights and biases to store and use. Each of these must be stored to a resolution that minimises memory use, yet maintains performance. Further, for each decision, 30 activation function evaluations must be made. The total number of multiply-add operations is equal to the number of weights. If table look-up is used for the activation function then this adds only a small further overhead. It is estimated that the total computation time would be of the order of tens of milliseconds on a 68000 processor, and only a few milliseconds on a typical digital signal processor.

The performance details and implementation analysis show that this embodiment is not only very effective but would add little to the recognition time. It is interesting to analyse the results further.

For the KNN rule by far the worst recognition was for the digit "nine" with only 87.4% correct (mainly confused with "five") and the best result was for the word "one" (98.0% correct). The MLP has completely changed this situation so that the range of individual rates is much smaller; from 94.8% for "two" to 99.5% for "seven". In particular "five"- "nine" confusions have been greatly reduced. The only digit to fare worse with the MLP rule was six, accuracy dropping from 97.2% to 96.2%. It is clear that these effects are caused by the discriminative training of the MLP—potential confusions are identified and decision surfaces constructed to minimise errors. On individual tokens this can have a dramatic effect. For example in one case for an input of the word "zero" from one speaker, the correct class "zero" was, under all KNN rules, placed fourth behind 8, 6 and 2. The ordering by the MLP with N=20, M=1.5 was 0,8,2,9.

This example used a twelve cluster per word system. Using MLP techniques it may well be possible to achieve comparable results using rather fewer clusters. This would enable either an increase in vocabulary size or reduced memory requirements for recognition hardware. It may also allow a speaker independent recognition system to be developed without the need for special purpose DTW hardware.

The MLP presented here performs an error correction function on the DTW score data. Any improvement in the DTW feature set will cause higher quality score data (fewer nearest neighbour errors) to be generated and still better overall performance will result.

Although this example describes only single or isolated word recognition, the invention is also applicable to connected-word recognition with an appropriate pattern matching stage.

We claim:

1. Apparatus for recognizing word patterns, comprising:
   an input for signal data; and
   at least two stages of recognition comprising:
   a pattern matching stage which includes a plurality of stores each storing a representation of a pattern to be recognized and means for producing, for each said representation, a measure of the similarity between the signal data and that representation; and
   a classification stage having a plurality of inputs, each input being connected to receive the measures of similarity produced for one of said representations,
   the classification stage deciding on the basis of taking into account all of the said measures which, if any, of the patterns to be recognized to which the representations correspond is present in the signal data, and which indicates the presence of any such pattern,
   the classification stage being trainable, with parameters of the classification stage derived from information related to a predetermined pattern represented by signal data input to the pattern matching stage and from the measures of similarity produced for each said representation from input of said signal data representing the predetermined pattern.

2. Apparatus as claimed in claim 1 wherein each pattern to be recognized corresponds to a predetermined non-zero function of at least two of a predetermined plurality of the said measures.

3. Apparatus according to claim 1 in which the classification stage receives all the said measures, and calculates for each pattern to be recognized, a corresponding predetermined Gaussian function of the measures.

4. Apparatus according to claim 1 in which the classification stage calculates a plurality of sums of the products of each of a predetermined plurality of measures and derives respective corresponding weighting constants.

5. Apparatus according to claim 4 in which the classification stage processes each said sum by a non linear compression function, and calculates for each pattern to be recognized a further sum of the products of the processed sums and derives corresponding weighting factors.

6. Apparatus according to claim 1 in which the classification stage comprises a multi-layer perceptron.

7. Apparatus according to claim 1 in which the means for producing a measure of the similarity are arranged to do so substantially independently of the duration and/or position of events in the signal data.

8. Apparatus according to claim 7 in which the means for producing a measure of the similarity comprises a Dynamic Warp calculation.

9. Apparatus according to claim 7 in which the means for producing each measure of the similarity comprises calculating the similarity of the signal data to a stored Hidden Markov state transition Model.

10. An apparatus as claimed in claim 1 wherein said signal data comprises speech signal data.

11. Apparatus for recognizing word patterns according to claim 1, wherein the pattern matching stage is separately trained on a first set of test data and the classification stage is separately trained on a second set of test data not identical to the first.

12. A speech recognizer comprising:

means to pre-process speech signals to extract significant features of those signals;

store means to hold reference features corresponding to known speech patterns to be recognized;

comparison means to compare the features extracted from said speech signals with stored reference features and to produce for each comparison a measure of the similarity therebetween; and decision means having a plurality of inputs, each input connected to receive the measures of similarity produced for one of said features, said decision means determining on the basis of all said measures of similarity the speech pattern to which an input signal is most similar;

characterized in that said decision means is one which has been trained using information relating to a known predetermined speech pattern represented by speech signals input to the means to pre-process speech signals and the measures of similarity produced by the comparison means for each said feature from the input of speech signals representing the said known predetermined speech pattern.

13. A recognizer as in claim 12 wherein the decision means comprises a multi-layer perceptron.

14. A recognizer as in claim 12 wherein said means to pre-process is arranged to produce mel-frequency cepstral coefficients.

15. A method of training a pattern recognition apparatus comprising:

receiving input signal data;

comparing the input signal data with each of a plurality of stored representations each corresponding to a pattern to be recognized to produce a similarity measure for each of the plurality of stored representations; and deriving parameters for a decision means for having a plurality of inputs connected to receive said similarity measures produced for one of said representations from information relating to a predetermined pattern and from (b) the said similarity measures produced for each representation on receiving input signal data corresponding to the predetermined pattern.

16. A method according to claim 15 in which the step of deriving said parameters includes the step of calculating a Gaussian function of said measures.

17. A method according to claim 15 in which the step of deriving said parameters includes the step of calculating a sum of the products of each of the measures and corresponding weighting constants.

18. A method according to claim 17, wherein the step of calculating a sum further comprises the steps of processing each such sum using a non linear sigmoidal function, and calculating a plurality of sums of the products of the processed sums and corresponding weighting constants.

19. A method according to claim 15, in which the step of comparing the input signal with each representation is performed so as to be substantially independent of the duration and/or position of pattern events in the signal data.

20. A method according to claim 19 in which the step of comparing the input signal data with each representation comprises employing a Dynamic Warp calculation.

21. A method according to claim 20 in which the step of comparing the input signal data with each representation comprises employing a Hidden Markov Model.

22. A method according to claim 15 wherein said input signal data comprises speech signal data.

23. A trained pattern recognizer comprising apparatus trained according to the method of claim 15.

* * * * *